United States Patent
Ito (10) Patent No.: US 7,782,516 B2
(45) Date of Patent: Aug. 24, 2010

(54) OPTICAL SCANNING PROJECTOR APPARATUS

(75) Inventor: Katsuyuki Ito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 243 days.

(21) Appl. No.: 11/889,138

(22) Filed: Aug. 9, 2007

(65) Prior Publication Data
US 2009/0051993 A1 Feb. 26, 2009

(30) Foreign Application Priority Data
Aug. 16, 2006 (JP) .............................. 2006-221752

(51) Int. Cl.
*G02B 26/08* (2006.01)
(52) U.S. Cl. .................................. 359/204.1
(58) Field of Classification Search ............... 359/204.1
See application file for complete search history.

(56) References Cited

U.S. PATENT DOCUMENTS
2005/0162845 A1* 7/2005 McDermott .................. 362/35

FOREIGN PATENT DOCUMENTS
JP 10-240166 9/1998

OTHER PUBLICATIONS

Lim, C.; Jeung, W.; Choi, S.: LED Packaging Using High Sag Rectangular Microlens Array: Apr. 2006: SPIE: Proc. SPIE vol. 6185: pp. 1, 6.*

Benson, T.; Boriskina, S.; Sewell, P.; Vukovic, A.; Greedy, S.; Nosich, A.: Frontiers in Planar Lightwave Circuit Technology: Dec. 2005: Springer Netherlands: NATO Science Series, vol. 216, pp. 54.*

* cited by examiner

*Primary Examiner*—Stephone B Allen
*Assistant Examiner*—Jennifer L. Doak
(74) *Attorney, Agent, or Firm*—Kubotera & Associates LLC (57) ABSTRACT

An optical scanning projector apparatus includes a light emitting element array having a plurality of light emitting elements arranged in a row in a first direction for emitting light according to display data; a light scanning unit for scanning light of the light emitting elements in a second direction perpendicular to the first direction; a scanning optical system for collecting light of the light emitting elements to form an image on a screen; and a control unit for controlling the light scanning unit and the scanning optical system. The light emitting elements include micro resonator type light emitting diodes (LED) having a radiation angle smaller than or equal to 20 degrees at a half of maximum light intensity.

5 Claims, 5 Drawing Sheets

OPTICAL SCANNING PROJECTOR APPARATUS

BACKGROUND OF THE INVENTION AND RELATED ART STATEMENT

The present invention relates to an optical scanning projector apparatus.

A conventional projector apparatus has been used as a display of a personal computer and a television for displaying various images. The conventional projector apparatus is provided with a high-pressure mercury lamp or a light emitting diode (LED) element as a light source. Further, there is provided a device such as a liquid crystal panel as an imaging element for selecting light from the light source and a micromirror array for controlling an angle of a reflection mirror.

In contrast, there has been known an optical scanning projector apparatus for scanning light from an LED array formed of LED elements arranged in an array pattern (refer to Patent Reference).

Patent Reference: Japanese Patent Publication No. 10-240166

In the optical scanning projector apparatus, the LED array does not generate a sufficient amount of light. Accordingly, it is difficult to display an image sufficiently bright to be visible in a bright room.

In view of the problems described above, an object of the invention is to provide an optical scanning projector apparatus capable of solving the problems. In particular, a plurality of light emitting elements is arranged such that a specific relationship is established among a radiation angle of light, an aperture of a collecting optical system, and a focal length. Accordingly, it is possible to efficiently radiate light emitting from the light emitting elements into the collecting optical system. As a result, it is possible to reduce loss of light, thereby displaying an image sufficiently bright visible in a bright room.

Further objects and advantages of the invention will be apparent from the following description of the invention.

SUMMARY OF THE INVENTION

In order to attain the objects described above, according to the present invention, an optical scanning projector apparatus includes a light emitting element array having a plurality of light emitting elements arranged in a row in a first direction for emitting light according to display data; a light scanning unit for scanning light of the light emitting elements in a second direction perpendicular to the first direction; a scanning optical system for collecting light of the light emitting elements to form an image on a screen; and a control unit for controlling the light scanning unit and the scanning optical system. The light emitting elements include micro resonator type light emitting diodes (LED) having a radiation angle smaller than or equal to 20 degrees at a half of maximum light intensity.

In the present invention, the optical scanning projector apparatus includes the light emitting element array having the light emitting elements arranged in a specific manner. Accordingly, it is possible to efficiently radiate light emitting from the light emitting elements to a collective optical system, thereby reducing optical loss. As a result, it is possible to display a bright image sufficiently visible even in a bright room.

BRIEF DESCRIPTION OF THE DRAWINGS

FIGS. 8(a) and 8(b) are schematic views showing a light emitting element array according to a second embodiment of the present invention, wherein

DESCRIPTION OF THE PREFERRED EMBODIMENTS

Hereunder, embodiments of the present invention will be explained with reference to the accompanying drawings. In the description below, a color printer is described as an example of an optical scanning projector apparatus.

First Embodiment

Figure 1:
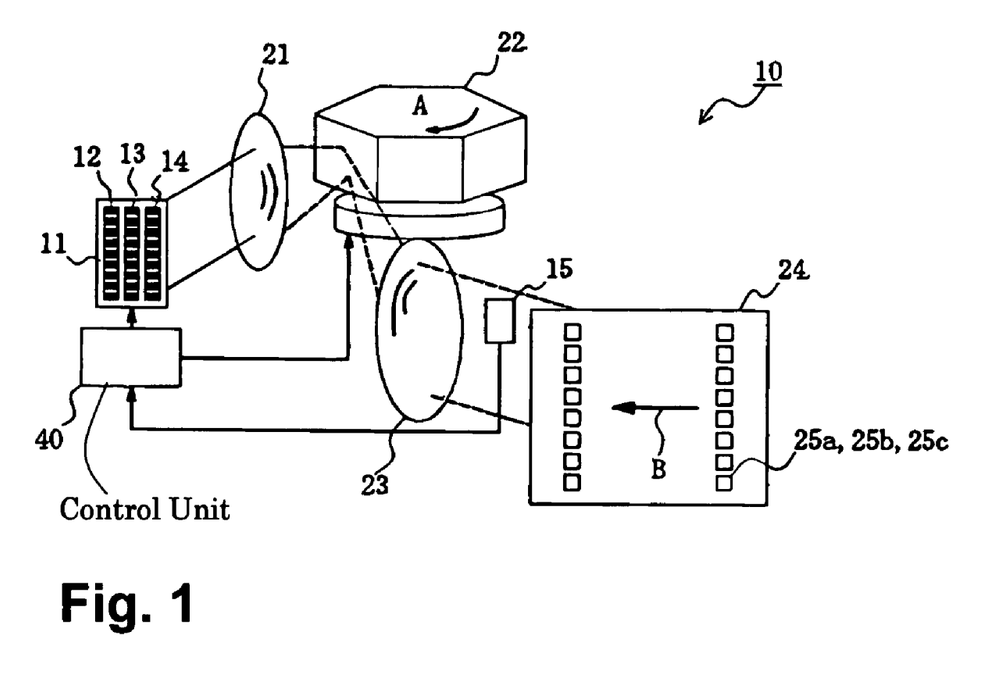
FIG. 1 is a schematic view showing an optical scanning projector apparatus according to a first embodiment of the present invention.

A first embodiment of the present invention will be explained. FIG. 1 is a schematic view showing a projector 10 as an optical scanning projector apparatus according to the first embodiment of the present invention. The projector 10 is used as a display of, for example, a personal computer, a television and the likes for displaying various images, and may be used for any devices and any purposes.

As shown in FIG. 1, the projector 10 is provided with a three-color array board 11; a polygon mirror 22 as a light scanning unit; a screen 24 for displaying an image; and a control unit 40 for controlling the three-color array board 11 and the polygon mirror 22.

In the embodiment, the three-color array board 11 includes an R light emitting element array 12 for emitting light in red; a G light emitting element array 13 for emitting light in green; and a B light emitting element array 14 for emitting light in blue. Further, the three-color array board 11 is provided with an R driver integrated circuit (IC) 12a, a G driver IC 13a, and a B driver IC 14a as driver elements for driving the R light emitting element array 12, the G light emitting element array 13, and the B light emitting element array 14.

In the embodiment, in each of the R light emitting element array 12, the G light emitting element array 13, and the B light emitting element array 14, light emitting diodes (LED) 31 as light emitting elements are arranged in a Y direction (vertical direction in FIG. 1) with a specific interval. In particular, about 600 of the LEDs 31 are arranged in a row, so that light emitting points has a density of larger than, for example, 600 dpi. Further, the R light emitting element array 12, the G light emitting element array 13, and the B light emitting element array 14 are arranged in parallel with an interval of, for example, a few millimeters in an X direction (horizontal direction in FIG. 1).

In the embodiment, a collective lens 21 as a collecting optical system is situated between the three-color array board 11 and the polygon mirror 22. A projection lens 23 and a screen 24 as a scanning optical system are arranged in this order at an upstream side of the polygon mirror 22. Accordingly, the collective lens 21 and the projection lens 23 enlarge and display light images 25a, 25b, and 25c of the R light emitting element array 12, the G light emitting element array 13, and the B light emitting element array 14 on the screen 24. In the specification, the light images 25a, 25b, and 25c are collectively referred to as light images 25.

In the embodiment, a light receiving sensor 15 is disposed between the projection lens 23 and the screen 24. When the light images 25 rotates to a scanning start position, the light receiving sensor 15 receives scanning light and sends a synchronizing signal S to the control unit 40.

When the polygon mirror 22 rotates in an arrow direction A at a constant angular speed, the light images 25 move on the screen 24 in an arrow direction B. In this case, when the polygon mirror 22 scans light with one surface thereof, one screen is displayed on the screen 24. The polygon mirror 22 is provided with a DC motor (not shown). The control unit 40 controls the DC motor, so that rotation of the polygon mirror 22 is adjusted. Further, the polygon mirror 22 has six reflection surfaces. Accordingly, when the screen 24 rotates at a speed of, for example, 300 rpm, 30 screens are displayed on the screen 24 per one second.

Figure 2:
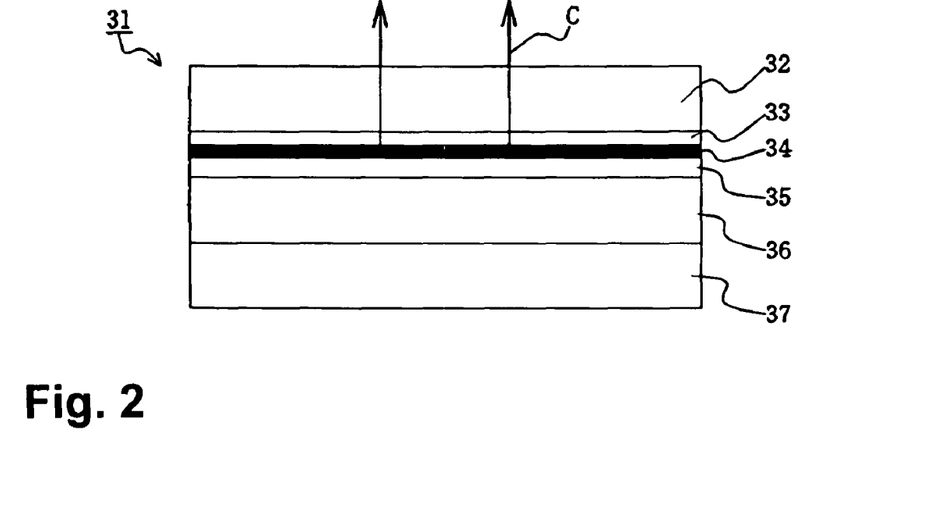
FIG. 2 is a schematic view showing one light emitting diode (LED) arranged on a light emitting element array according to the first embodiment of the present invention.
Figure 3:
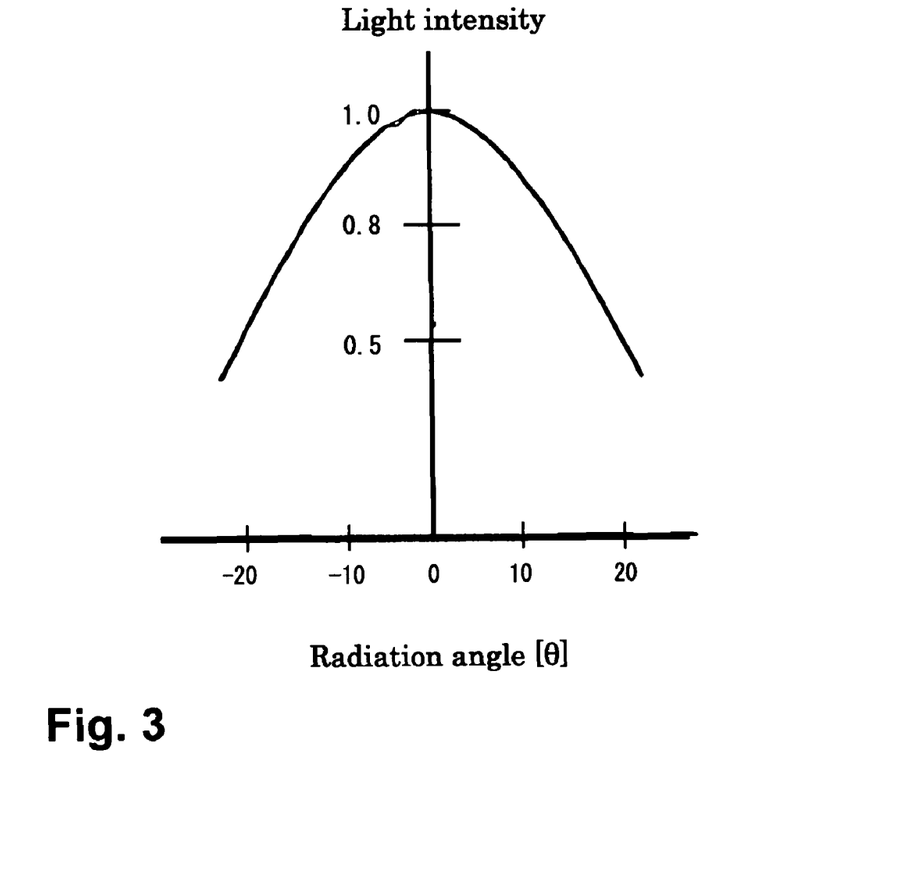
FIG. 3 is a graph showing a radiation angle characteristic of light emitting from the LED according to the first embodiment of the present invention.

A configuration of the LEDs 31 will be explained next. FIG. 2 is a schematic view showing one of the LEDs 31 arranged on one of the light emitting element arrays according to the first embodiment of the present invention. FIG. 3 is a graph showing a radiation angle characteristic of light emitting from the LEDs 31 according to the first embodiment of the present invention.

In the embodiment, the LEDs 31 are arranged in a row for emitting light according to display data, and are formed of micro resonance type LEDs. As shown in FIG. 2, the LED 31 includes a substrate 37 formed of sapphire with a GaN layer grown thereon. An n-type distributed Bragg reflection (DBR) layer 36 as a Bragg reflection mirror is formed on the substrate 37. The DBR layer 36 is formed of n-AlGaN/n-GaN laminated alternately, and has a reflectance of substantially 100% relative to a wavelength of emitting light.

Further, an n-type clad layer 35, an activation layer 34, and a p-type clad layer 33 are sequentially laminated on the DBR layer 36. A p-type DBR layer 32 is formed on the p-type clad layer 33. The p-type DBR layer 32 functions as a Bragg reflection mirror formed of, for example, a dielectric multi-layered layer, and has a reflectance of substantially 70% relative to a wavelength of emitting light.

In the embodiment, the n-type DBR layer 36 is disposed away from the p-type DBR layer by a distance equal to three times of a wavelength of emitting light, thereby constituting a micro resonator. The activation layer 33 generates light, and a double hetero structure formed of the n-type clad layer 35 and the p-type clad layer 33, i.e., the clad layers on both sides the activation layer 33, enhances light emission efficiency. The micro resonator selects a wavelength of emitting light and emits light upward toward outside above the p-type DBR layer 32.

FIG. 3 is a graph showing a radiation angle characteristic of light emitting from the LEDs 31. In FIG. 3, a vertical axis represents a radiation angle θ, and a horizontal axis represents light intensity. The radiation angel θ is defined as an angle of light path emitting from the LEDs 31 relative to a vertical line perpendicular to a projection plane. As shown in FIG. 3, the intensity of light emitting from the LEDs 31 becomes half at the radiation angle of about 20 degrees. Accordingly, the LEDs 31 with the micro resonance structure have directional characteristic with the radiation angle θ smaller than or equal to 20 degrees. In other words, the LEDs 31 have a practical radiation angle θ smaller than or equal to 20 degrees, within which light intensity is maintained at least half of the maximum value.

Figure 4:
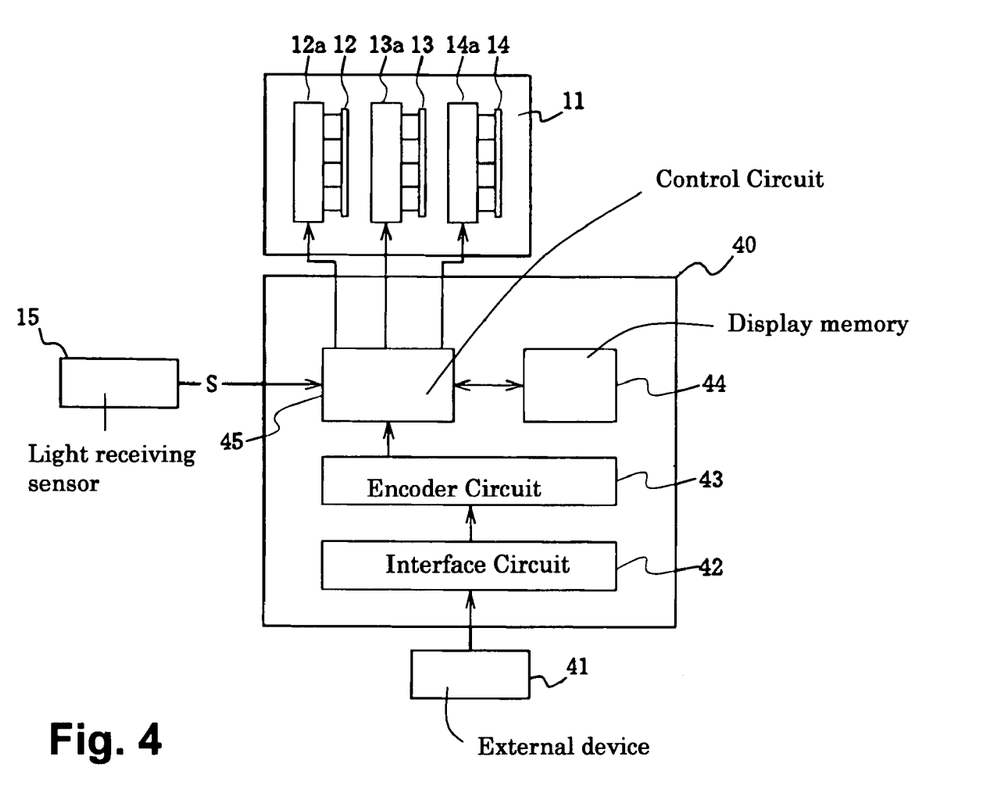
FIG. 4 is a block diagram showing a three-color array board and a control unit according to the first embodiment of the present invention.

A configuration of the three-color array board 11 and the control unit 40 will be explained next. FIG. 4 is a block diagram showing the three-color array board 11 and the control unit 40 according to the first embodiment of the present invention.

In the embodiment, the control unit 40 may includes a computer such as a micro computer having a processing unit, a storage unit, a communication interface, and the likes, and may include any types of devices. The control unit 40 controls the polygon mirror 22 and the LEDs 31, so that a moving operation of the polygon mirror 22 synchronizes with a light emitting operation of the LEDs 31 to display the images.

As shown in FIG. 4, the control unit 40 includes an interface circuit 42 for receiving display data from an external device 41, and an encoder circuit 43 for digitizing a display signal and generating the display data. Further, the control unit 40 receives the synchronizing signal S from the light receiving sensor 15. The external device 41 includes a personal computer, a television, and the likes for displaying an image with the projector 10.

In the embodiment, the control unit 40 also includes a control circuit 45 and a display memory unit 44. The control circuit 45 controls the display memory unit 44 to write and read data; sends data to the three-color array board 11; and controls the three-color array board 11. The display memory unit 44 has a display memory area corresponding to the display data in colors of red, green, and blue for displaying a color image.

In the embodiment, the three-color array board 11 is provided with the R driver integrated circuit (IC) 12a, the G driver IC 13a, and the B driver IC 14a as the driver elements for driving the R light emitting element array 12, the G light emitting element array 13, and the B light emitting element array 14. The R driver IC 12a, the G driver IC 13a, and the B driver IC 14a are connected to the R light emitting element array 12, the G light emitting element array 13, and the B light emitting element array 14, respectively. Each of the R driver IC 12a, the G driver IC 13a, and the B driver IC 14a includes a latch circuit and a shift register of the display data for one row.

Figure 5:
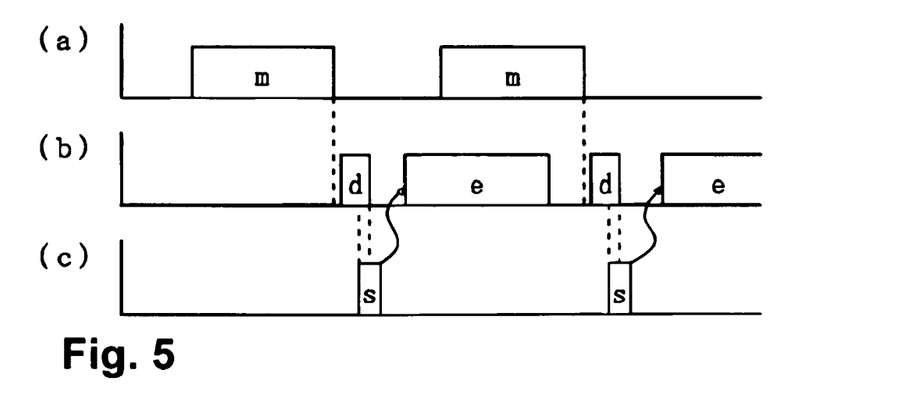
FIG. 5 is a time chart showing an operation of the control unit according to the first embodiment of the present invention.

An operation of the projector 10 will be explained next. First, an operation of the control unit 40 for displaying an image on the screen 24 will be explained. FIG. 5 is a time chart showing the operation of the control unit 40 according to the first embodiment of the present invention.

As shown in FIG. 5, a time chart (a) represents a timing of storing the display data to the display memory unit 44; a time chart (b) represents a timing of the control unit 40 sending the data to the three-color array board 11; and a time chart (c) represents a timing of the synchronizing signal S from the light receiving sensor 15.

In the embodiment, the display data is stored in the display memory unit 44 at timings m shown in the time chart (a). In this process, the interface circuit 42 receives the display signal from the external device 41, and the encoder circuit 43 generates the display data. Then, the control circuit 45 stores the display data in the display memory unit 44. Note that the display memory unit 44 has two screen memory areas corresponding to each of the colors in red, green, and blue in the display data. While one of the screen memory areas is used for displaying an image, the display data is written in the other of the screen memory areas.

In the next step, the control circuit 45 sends dummy data at a timing d shown in the time chart (b), so that the control circuit 45 receives the synchronizing signal S from the light receiving sensor 15 at a timing s shown in the time chart (c). Accordingly, the dummy data is sent to the R driver IC 12a of the three-color array board 11, so that a specific light emitting element emits light. When the light receiving sensor 15 receives light emitting from the specific light emitting element, the light receiving sensor 15 generates and sends the synchronizing signal S to the control circuit 45.

In the next step, the control circuit 45 sequentially sends the dummy data to the G driver IC 13a and the B driver IC 14a at a specific interval, so that specific light emitting elements sequentially emit light. Through the process described above, the control circuit 45 sequentially receives the synchronizing signal S in each of red, green, and blue.

After a specific period of time since the control circuit 45 receives the synchronizing signal S in red, the control circuit 45 reads the display data for one row from the memory area of the display memory unit 44 corresponding to red at a timing a shown in the time chart (b), so that the control circuit 45 sends the display data to the R driver IC 12a of the three-color array board 11. Accordingly, the R driver IC 12a inputs the display data for one row to a shift register, and latches the display data to the latch circuit according to a latch signal from the control circuit 45. Afterward, the control circuit 45 sends a drive signal to the R driver IC 12a, so that the R light emitting element array 12 emits light according to the display data latched in the latch circuit.

Similarly, when the control circuit 45 receives the synchronizing signal S in green, the control circuit 45 reads the display data for one row from the memory area of the display memory unit 44 corresponding to green. Then, the control circuit 45 sends a drive signal to the G driver IC 13a, so that the G light emitting element array 13 emits light. When the control circuit 45 receives the synchronizing signal S in blue, the control circuit 45 reads the display data for one row from the memory area of the display memory unit 44 corresponding to blue. Then, the control circuit 45 sends a drive signal to the B driver IC 14a, so that the B light emitting element array 14 emits light.

Through the process described above, the control circuit 45 sends all of the display data per one row stored in the display memory unit 44 to the three-color array board 11. After the R light emitting element array 12, the G light emitting element array 13, and the B light emitting element array 14 emit light, respectively, one screen is completely scanned. Similarly, subsequent screens are scanned, thereby obtaining a display image on the screen 24.

Figure 6:
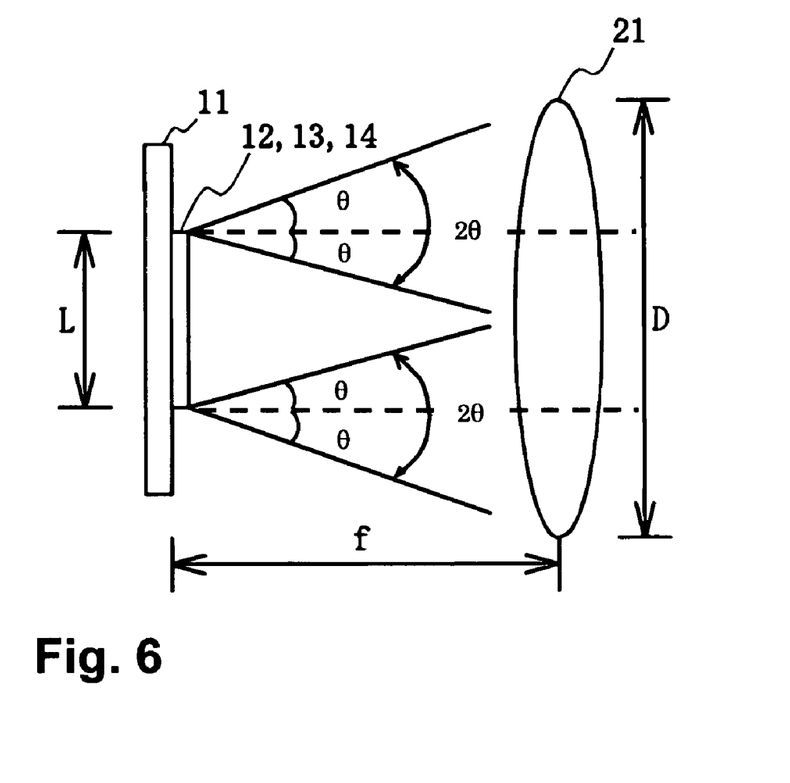
FIG. 6 is a schematic view showing a radiation angle of a light emitting element with respect to a direction perpendicular to an arrangement direction of the light emitting element array according to the first embodiment of the present invention.
Figure 7:
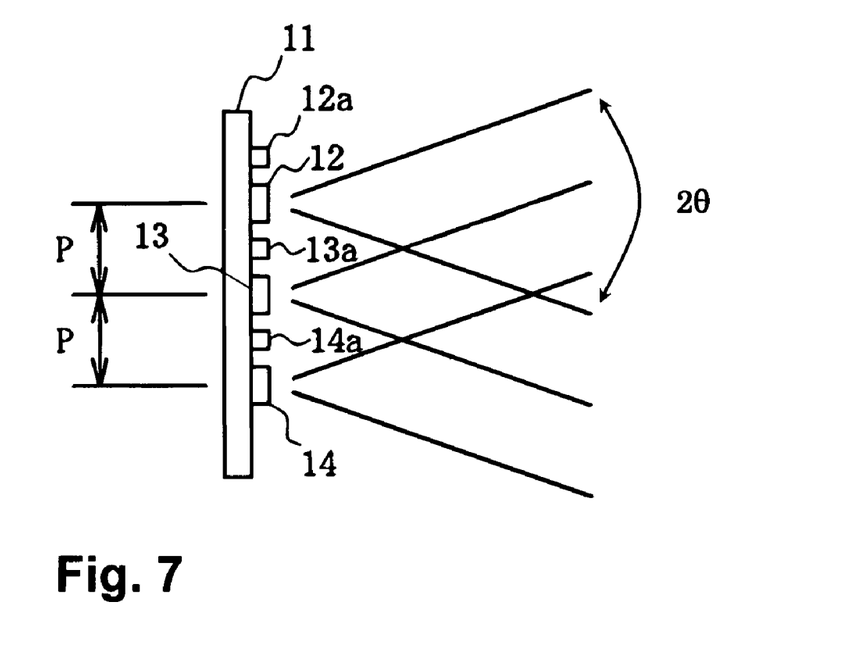
FIG. 7 is a schematic view showing a radiation angle of the light emitting element with respect to the arrangement direction of the light emitting element array according to the first embodiment of the present invention.

A method of determining the arrangement of the LEDs 31 in the R light emitting element array 12, the G light emitting element array 13, and the B light emitting element array 14 will be explained next. FIG. 6 is a schematic view showing a radiation angle of the light emitting element with respect to a direction perpendicular to an arrangement direction of the light emitting element array according to the first embodiment of the present invention. FIG. 7 is a schematic view showing a radiation angle of the light emitting element with respect to the arrangement direction of the light emitting element array according to the first embodiment of the present invention.

In the embodiment, the R light emitting element array 12, the G light emitting element array 13, and the B light emitting element array 14 are mounted on the three-color array board 11 with an interval space P as shown in FIG. 7. It is arranged such that almost all of light emitted from the LEDs 31 in the R light emitting element array 12, the G light emitting element array 13, and the B light emitting element array 14 is irradiated into the collective lens 21, thereby obtaining a bright image on the screen 24.

As shown in FIG. 6, each of in the R light emitting element array 12, the G light emitting element array 13, and the B light emitting element array 14 has a length L; each of the LEDs 31 has a radiation angle $\theta$; and the collective lens 21 has a diameter D and a focal length f. In order to focus light emitted from the R light emitting element array 12, the G light emitting element array 13, and the B light emitting element array 14, it is necessary to establish the following equation (1):

$$\tan \theta < (D-L)/2f \quad (1)$$

When an n number of array elements are arranged with the interval distance P as shown in FIG. 7, it is possible to determine an optical loss from the equation (1) when L is greater than (n−1) times P (L>(n−1)P). For example, when the R light emitting element array 12, the G light emitting element array 13, and the B light emitting element array 14 have a width of less than 1.0 mm and the interval distance P is less than 2.0 nun, the length L (4 mm) becomes greater than (n−1) times the interval distance P (2·P), thereby making it possible to reduce optical loss.

In the collective lens 21, an F number thereof is defined by a ratio of the diameter D and the focal length f (F=D/f), and the F number is equal to or less than one (F≦1). As explained with FIG. 3, with the micro resonator, it is possible to provide the LEDs 31 with the directional characteristic smaller than 20 degrees.

For example, when the radiation angle $\theta$ is 20 degrees, and the diameter D and the focal length f are 30 mm, the length L is equal to or smaller than 8.0 mm (L≦8) from the equation (1). In this case, when one thousand of the LED5 31 are arranged in each of the R light emitting element array 12, the G light emitting element array 13, and the B light emitting element array 14, a pitch of the LEDs 31, i.e., an element pitch, becomes 8.0 μm.

In another case, when the radiation angle $\theta$ is 25 degrees, and the diameter C and the focal length f are 30 mm, the length L is equal to or smaller than 2.0 mm (L≦2) from the equation (1). In this case, when one thousand of the LEDs 31 are arranged in each of the R light emitting element array 12, the G light emitting element array 13, and the B light emitting element array 14, a pitch of the LEDs 31, i.e., an element pitch, becomes 2.0 μm. The element pitch of 2.0 μm is not practical according to current technology.

In a further case, when the radiation angle $\theta$ is 15 degrees, and the diameter D and the focal length f are 30 mm, the length L is equal to or smaller than 14.0 mm (L≦14) from the equation (1). In this case, when one thousand of the LEDs 31 are arranged in each of the R light emitting element array 12, the G light emitting element array 13, and the B light emitting element array 14, a pitch of the LEDS 31, i.e., an element pitch, becomes 14.0 µm. With the element pitch of 14.0 µm, it is easy to form the R light emitting element array 12, the G light emitting element array 13, and the B light emitting element array 14.

When the diameter D and the focal length f of the collective lens 21 increase, a size of light beam radiating from the collective lens 21 increases, thereby making it necessary to increase a size of the mirror surface of the polygon mirror 22. When a size of the mirror surface of the polygon mirror 22 increases, it is difficult to produce the mirror surface, and a load to a DC motor for rotating the collective lens 21 increases. In contrast, when the diameter D and the focal length f of the collective lens 21 are less than 30 mm, it is difficult to reduce a size of the projector 10.

As described above, the projector 10 is provided with the R light emitting element array 12, the G light emitting element array 13, and the B light emitting element array 14 having the LEDs 31 with the micro resonator arranged in an array pattern. Accordingly, it is possible to make the radiation angel θ of the LEDs 31 less than 20 degrees. Further, it is possible to satisfy the equation (1) according to the diameter D and the focal length f of the collective lens 21; the length L of the R light emitting element array 12, the C light emitting element array 13, and the B light emitting element array 14; the pitch of the LEDs 31, thereby making it possible to obtain a bright image with less optical loss.

In the embodiment, it is preferred that a reflectivity of the p-type DBR layer 32, i.e., the DBR on the output side of the LEDs 31, increases up to about 80%. Accordingly, it is possible to increase performance of the LEDs 31 as a resonator, and to make the radiation angel θ of the LEDs 31 less than or equal to 15 degrees. Further, it is possible to increase the length L of the R light emitting element array 12, the G light emitting element array 13, and the B light emitting element array 14, and the pitch of the LEDs 31, thereby making a production process easy.

Note that when the reflectivity of the p-type DBR layer 32 increases further, the p-type DBR layer 32 becomes a laser for generating coherent light. Since the projector 10 radiates light to outside, coherent light may pose safety risk. In the embodiment, the LEDs 31 radiate light other than coherent light, thereby posing no safety risk.

As described above, in the embodiment, the LEDs 31 of the projector 10 have the micro resonator. Accordingly, it is possible to efficiently radiate light emitting from the LEDs 31 to the collective lens 21, thereby reducing optical loss. As a result, it is possible to display a bright image on the screen 24 sufficiently visible even in a bright room.

Second Embodiment

A second embodiment of the invention will be described below. Components in the second embodiment similar to those in the first embodiment are designated by the same reference numerals, and explanations thereof are omitted. Explanations of operations and effects similar to those in the first embodiment are omitted as well.

Figure 8:
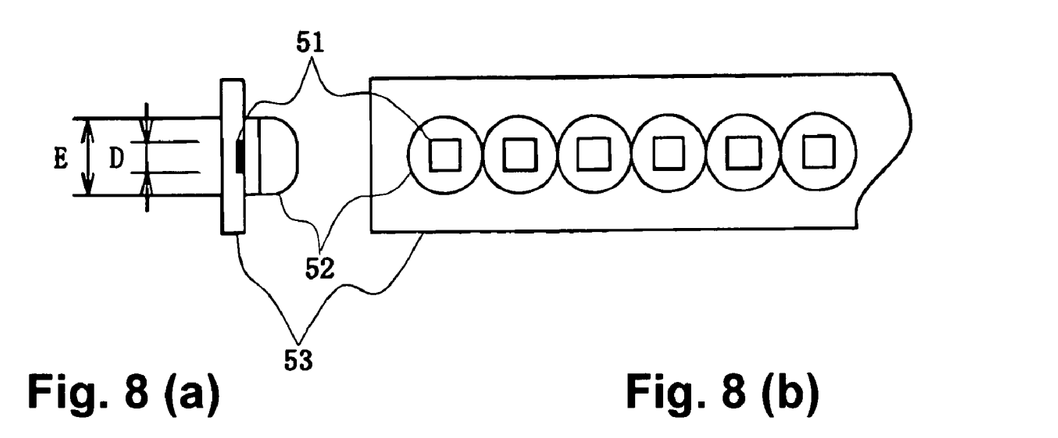
FIG. 8(a) is a schematic side view thereof and FIG. 8(b) is a schematic front view thereof.

FIGS. 8(a) and 8(b) are schematic views showing a light emitting element array 53 according to the second embodiment of the present invention. In particular, FIG. 8(a) is a schematic side view of the light emitting element array 53, and FIG. 8(b) is a schematic front view thereof.

Figure 9:
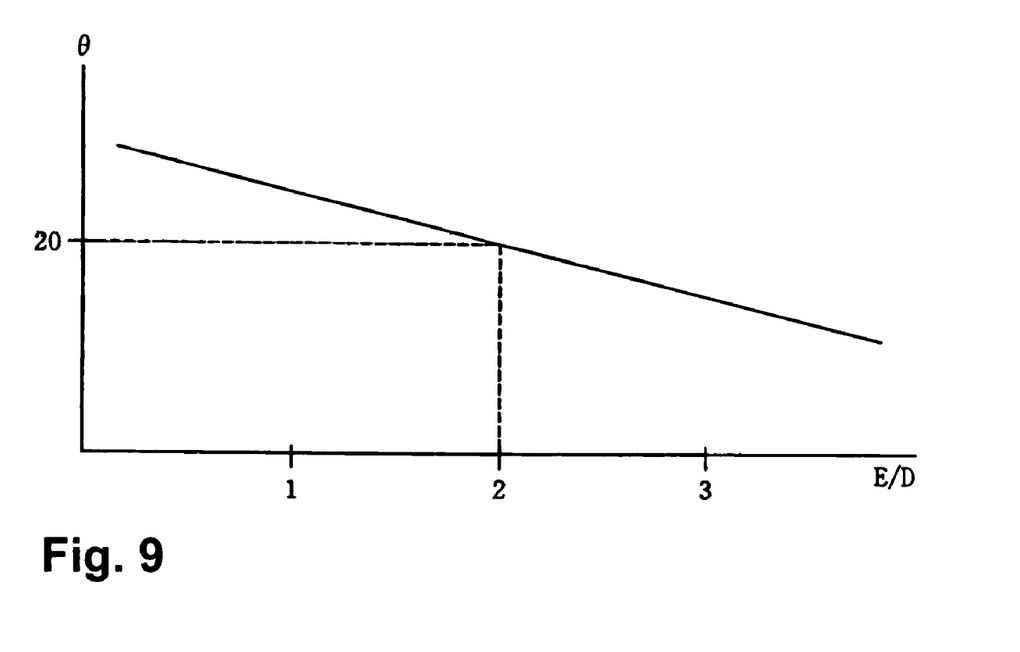
FIG. 9 is a graph showing a relationship between a radiation angle of light and a ratio of a diameter of a micro lens to a light emitting diameter of a light emitting element according to the second embodiment of the present invention.

FIG. 9 is a graph showing a relationship between a radiation angle θ of light and a ratio of a diameter E of a micro lens 52 to a light emitting diameter D of a light emitting element 51 according to the second embodiment of the present invention. In FIG. 9, a vertical axis represents the radiation angle θ of light, and a horizontal axis represents the ratio of the diameter E of the micro lens 52 to the light emitting diameter D of the light emitting element 51.

As shown in FIGS. 8(a) and 8(b), the light emitting elements 51 formed of an LED element, an electro-luminescence (EL) element, or the like are arranged on the light emitting element array 53 in a row. Each of the light emitting elements 51 is integrated with the micro lens 52. The light emitting element 51 has the light emitting diameter D, and the micro lens 52 has the diameter E.

In the embodiment, the light emitting element 51 does not have any direction characteristic in terms of light radiation. The micro lens 52 may be formed with a method applied to semiconductor manufacturing technology. For example, after a thin coating of an organic lens material is formed on the light emitting element array 53, the micro lens 52 with a specific size is formed with photo-resist. Then, the organic lens material is melted to form in a lens shape, and is calcined in a solid form.

As shown in FIG. 9, the radiation angle θ of light emitting from the light emitting element 51 and radiating through the micro lens 52 changes according to the ratio of the light emitting diameter D of the light emitting element 51 to the diameter E of the micro lens 52. When the ratio (E/D) increases, the radiation angle θ decreases, thereby narrowing direction characteristic. In order to obtain the radiation angle θ of 20 degrees, it is necessary to make the ratio (E/D) 2. That is, it is preferred that the diameter E of the micro lens 52 is more than double of the light emitting diameter D of the light emitting element 51.

For example, when the light emitting diameter D of the light emitting element 51 is 4.0 µm, the diameter E of the micro lens 52 is preferably 8.0 µm. In this case, when one thousand of the light emitting elements 51 are arranged in the light emitting element array 53, a length L of the light emitting element array 53 becomes 8.0 mm.

Similar to the case in the first embodiment, when the radiation angle θ is 20 degrees, and the diameter D and the focal length f are 30 mm, the length L is equal to or smaller than 8.0 mm (L≦8) from the equation (1). Accordingly, it is possible to efficiently radiate light emitting from the light emitting elements 51 to the collective lens 21 for conversion, and to efficiently display on the screen 24, thereby obtaining a bright image with small optical loss.

As described above, in the embodiment, the micro lens 52 is integrated on the light emitting surface of each of the light emitting elements 51 arranged in the light emitting element array 53. Accordingly, it is possible to efficiently radiate light emitting from the light emitting elements 51 to the collective lens 21, thereby reducing optical loss. As a result, it is possible to display a bright image sufficiently visible even in a bright room.

According to the present invention, the projector 10 is applicable to a front-type projector or a rear-type projector.

The disclosure of Japanese Patent Application No. 2006-221752, filed on Aug. 16, 2006 is incorporated in the application by reference.

While the invention has been explained with reference to the specific embodiments of the invention, the explanation is illustrative and the invention is limited only by the appended claims.

What is claimed is:

1. An optical scanning projector apparatus comprising:
   a light emitting element array having a plurality of light emitting elements arranged in a row in a first direction for emitting light according to display data, each of said light emitting elements being integrated with a micro lens and having a radiation angle smaller than 20 degrees at a half of maximum light intensity thereof, each of said light emitting elements having a light emitting diameter smaller than a half of a diameter of the micro lens;

a light scanning unit for scanning light of the light emitting elements in a second direction perpendicular to the first direction;

a scanning optical system for collecting light of the light emitting elements to form an image on a screen;

a control unit for controlling the light scanning unit and the scanning optical system; and a light collecting optical system disposed between the light emittting element array and the light scanning unit, wherein said radiation angle is relative to a direction perpendicular to an arrangement direction of the light emitting elements and to a perpendicular line toward the light scanning unit.

2. The optical scanning projector apparatus according to claim 1, wherein said light collecting optical system has a diameter D and a focal length f so that the following relationship is established, $\tan \theta < (D-L)/2f$ where $\theta$ is the radiation angle of each of the light emitting elements.

3. The optical scanning projector apparatus according to claim 1, wherein said light collecting optical system includes a collective lens.

4. An optical scanning projector apparatus comprising:

a light emitting element array having a length L, said light emitting element array including a plurality of light emitting elements arranged in a row in a first direction for emitting light according to display data, each of said light emitting elements having a radiation angle $\theta$ smaller than 20 degrees at a half of maximum light intensity thereof, each of light emitting elements including a substrate, a first distributed Bragg reflection (DBR) layer, a first clad layer, an activation layer, a second clad layer, and a second DBR layer each laminated in this order, said first DBR layer having a reflectance greater than that of the second DBR layer, said first DBR layer being away from the second DBR layer by a distance equal to three times of a frequency of emitting light;

a light scanning unit for scanning light of the light emitting elements in a second direction perpendicular to the first direction;

a light collecting optical system disposed between the light emitting element array and the light scanning unit, said light collecting optical system having a diameter D and a focal length f so that the following relationship is established, $\tan \theta < (D-L)/2f$;

a scanning optical system for collecting light scanned with the light scanning unit to form an image on a screen; and a control unit for controlling the light scanning unit and the scanning optical system.

5. The optical scanning projector apparatus according to claim 4, wherein said light emitting elements are arranged at an n number of locations with an interval P so that the following relationship is established, $P < L/(n-1)$ wherein said radiation angle $\theta$ is relative to a direction perpendicular to an arrangement direction of the light emitting elements and to a perpendicular line toward the light collecting optical system.

* * * * *